(12) United States Patent
Shibai et al.

(10) Patent No.: US 10,752,742 B2
(45) Date of Patent: Aug. 25, 2020

(54) DECORATIVE FILM

(71) Applicant: Sharp Kabushiki Kaisha, Sakai, Osaka (JP)

(72) Inventors: Yasuhiro Shibai, Sakai (JP); Ken Atsumo, Sakai (JP); Tokio Taguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/488,257

(22) PCT Filed: Oct. 13, 2017

(86) PCT No.: PCT/JP2017/037199
§ 371 (c)(1),
(2) Date: Aug. 23, 2019

(87) PCT Pub. No.: WO2018/154843
PCT Pub. Date: Aug. 30, 2018

(65) Prior Publication Data
US 2020/0002488 A1 Jan. 2, 2020

(30) Foreign Application Priority Data
Feb. 24, 2017 (JP) ................. 2017-034051

(51) Int. Cl.
C08J 5/18 (2006.01)
B32B 3/30 (2006.01)
(Continued)

(52) U.S. Cl.
CPC ............... C08J 5/18 (2013.01); B32B 3/30 (2013.01); B32B 27/08 (2013.01); B32B 27/18 (2013.01);
(Continued)

(58) Field of Classification Search
CPC .......................................... C08J 5/18
(Continued)

(56) References Cited

U.S. PATENT DOCUMENTS

| 2012/0135206 A1* | 5/2012 | Haraguchi | C08L 67/04 428/195.1 |
|---|---|---|---|
| 2014/0077418 A1* | 3/2014 | Otani | B29C 59/046 264/447 |
| 2016/0054478 A1* | 2/2016 | Otani | G02B 1/118 428/141 |
| 2016/0229095 A1* | 8/2016 | Mori | G02B 1/118 |

(Continued)

FOREIGN PATENT DOCUMENTS

JP 2012-141355 A 7/2012

OTHER PUBLICATIONS

Shibai et al., "Antifouling Film", U.S. Appl. No. 16/475,420, filed Jul. 2, 2019.
(Continued)

Primary Examiner — Tahseen Khan
(74) Attorney, Agent, or Firm — Keating & Bennett, LLP

(57) ABSTRACT

A decorative film includes: a substrate; and a polymer layer including on a surface thereof an uneven structure provided with projections at a pitch not longer than a wavelength of visible light. The substrate contains a polycarbonate at least in its surface close to the polymer layer. The polymer layer is a cured product of a polymerizable composition. The polymerizable composition contains a release agent, a polyfunctional acrylate containing one or both of an ethylene oxide group and a propylene oxide group, and 2-(2-vinyloxyethoxy)ethyl acrylate. The polymerizable composition contains, in terms of active components, given proportions of the release agent and the 2-(2-vinyloxyethoxy)ethyl acrylate. The polymerizable composition contains, in terms of active components, a given total amount of the ethylene oxide group and the propylene oxide group in the polyfunctional acrylate and the 2-(2-vinyloxyethoxy)ethyl acrylate.

19 Claims, 2 Drawing Sheets

(51) Int. Cl.
    *B32B 27/08*    (2006.01)
    *B32B 27/18*    (2006.01)
    *B32B 27/30*    (2006.01)
    *B32B 27/36*    (2006.01)
    *C08L 35/02*    (2006.01)

(52) U.S. Cl.
    CPC .......... *B32B 27/308* (2013.01); *B32B 27/365* (2013.01); *C08L 35/02* (2013.01); *B32B 2250/02* (2013.01); *B32B 2250/24* (2013.01); *B32B 2307/42* (2013.01); *B32B 2307/714* (2013.01); *B32B 2307/73* (2013.01); *B32B 2451/00* (2013.01); *C08J 2369/00* (2013.01); *C08J 2435/02* (2013.01); *C08J 2471/00* (2013.01)

(58) Field of Classification Search
    USPC .......................................................... 428/172
    See application file for complete search history.

(56)            References Cited

U.S. PATENT DOCUMENTS

2016/0257827 A1*  9/2016  Takiguchi ............... B32B 27/06
2018/0147873 A1*  5/2018  De Mondt ........... B41M 7/0027

OTHER PUBLICATIONS

Shibai et al., "Antifouling Film", U.S. Appl. No. 16/479,954, filed Jul. 23, 2019.

\* cited by examiner (a)

(b)

(c)

(d)

10,752,742 B2

DECORATIVE FILM

TECHNICAL FIELD

The present invention relates to decorative films. The present invention more specifically relates to a decorative film including an uneven structure of nanometer scale and preferably used to impart a design property.

BACKGROUND ART

Various optical films having antireflective properties have been studied (e.g., Patent Literature 1). In particular, optical films having an uneven structure of nanometer scale (nanostructure) are known for their excellent antireflective properties. This uneven structure has a continuously varying refractive index from the air layer to the substrate, thereby capable of reducing the reflected light significantly.

CITATION LIST

Patent Literature

Patent Literature 1: JP 2012-141355 A

SUMMARY OF INVENTION

Technical Problem

Such optical films, owing to their excellent antireflective properties, allow the base (e.g., surface of the target to which the optical film is bonded) to be observed clearly, and are therefore expected to be used not only as optical components but also as components imparting a design property, i.e., as decorative films. For example, when such a decorative film is bonded to a component such as a building component or an automobile component so as to impart a design property to the component, the decorative film is desired to have characteristics such as processability (e.g., ease of bending) and rubbing resistance (shock resistance). In this case, a triacetyl cellulose (TAC) film having been mainly used as optical purposes is insufficient as the substrate for the decorative film. A film suitable as the substrate is a polycarbonate (PC) film excellent in processability and rubbing resistance.

Although such a decorative film has excellent antireflective properties, the uneven structure on the surface may cause easy spread of dirt such as fingerprints (sebaceous dirt) sticking thereon and further cause difficulty in wiping off such dirt present between projections. Such sticking dirt has a reflectance that is very different from the reflectance of the decorative film, and thus is noticeable. This has increased the demand for decorative films showing excellent ease of wiping off dirt (e.g., ease of wiping off fingerprints), i.e., excellent antifouling properties.

The present inventors made studies on such films, and found that a decorative film increased in antifouling properties and rubbing resistance can be achieved by devising the materials of the polymer layer constituting the uneven structure of the decorative film. Specifically, using a release agent as a material of the polymer layer was found to increase the antifouling properties, and using a polyfunctional acrylate was found to increase the rubbing resistance. Also, increasing the crosslinking density of the polymer layer and decreasing the glass transition temperature thereof can significantly increase the rubbing resistance. For a decrease in glass transition temperature, use of a polyfunctional acrylate containing one or both of an ethylene oxide group and a propylene oxide group was found effective.

However, further studies made by the present inventors found that when a decorative film is used in which a polycarbonate film is used as a substrate and a polyfunctional acrylate containing one or both of an ethylene oxide group and a propylene oxide group is used as a material of the polymer layer, the adhesion between the polymer layer and the substrate may be insufficient, and thus it is difficult to simultaneously achieve the adhesion and the rubbing resistance. Specifically, the studies found that adding large amounts of the ethylene oxide group and the propylene oxide group increases the rubbing resistance but decreases the adhesion, whereas adding small amounts of these groups increases the adhesion but decreases the rubbing resistance.

As described above, conventional decorative films including a polycarbonate film as a substrate have a problem that they need to be increased in rubbing resistance and adhesion as well as antifouling properties. However, no means to solve the problem has been found. For example, Patent Literature 1 does not mention anything about simultaneous achievement of the rubbing resistance and the adhesion in the case of using a polycarbonate film as a substrate, and therefore cannot solve the above problem.

In response to the above current state of the art, an object of the present invention is to provide a decorative film excellent in antifouling properties, rubbing resistance, and adhesion even in the case of including a substrate containing a polycarbonate at least in the surface.

Solution to Problem

The present inventors made various studies on a decorative film excellent in antifouling properties, rubbing resistance, and adhesion even in the case of including a substrate containing a polycarbonate at least in the surface. The inventors then found a technique of adding, as materials of the polymer layer, a release agent, a polyfunctional acrylate containing one or both of an ethylene oxide group and a propylene oxide group, and 2-(2-vinyloxyethoxy)ethyl acrylate, and setting the total of the ethylene oxide group content and the propylene oxide group content to a value in a predetermined range. Thereby, the inventors successfully solved the above problem, completing the present invention.

In other words, one aspect of the present invention may be a decorative film including: a substrate; and a polymer layer disposed on a surface of the substrate and including on a surface thereof an uneven structure provided with projections at a pitch not longer than a wavelength of visible light, the substrate containing a polycarbonate at least in its surface close to the polymer layer, the polymer layer being a cured product of a polymerizable composition, the polymerizable composition containing a release agent, a polyfunctional acrylate containing one or both of an ethylene oxide group and a propylene oxide group, and 2-(2-vinyloxyethoxy)ethyl acrylate, the polymerizable composition containing, in terms of active components, 0.5 to 10 wt % of the release agent and 10 to 70 wt % of the 2-(2-vinyloxyethoxy) ethyl acrylate, the polymerizable composition containing, in terms of active components, a total of 35 to 70 wt % of the ethylene oxide group and the propylene oxide group in the polyfunctional acrylate and the 2-(2-vinyloxyethoxy)ethyl acrylate.

The release agent may contain a fluorine-containing compound as an active component.

The fluorine-containing compound may contain a perfluoropolyether group.

The polymerizable composition may contain, in terms of active components, 15 to 65 wt % of the 2-(2-vinyloxyethoxy)ethyl acrylate, and the polymerizable composition may contain, in terms of active components, a total of 40 to 65 wt % of the ethylene oxide group and the propylene oxide group in the polyfunctional acrylate and the 2-(2-vinyloxyethoxy)ethyl acrylate.

The polymerizable composition may contain, in terms of active components, 20 to 60 wt % of the 2-(2-vinyloxyethoxy)ethyl acrylate, and the polymerizable composition may contain, in terms of active components, a total of 45 to 60 wt % of the ethylene oxide group and the propylene oxide group in the polyfunctional acrylate and the 2-(2-vinyloxyethoxy)ethyl acrylate.

The polymerizable composition may further contain a monofunctional amide monomer.

The monofunctional amide monomer may include N,N-dimethylacrylamide.

The polymer layer may have a surface that shows a contact angle of 130° or greater with water and a contact angle of 30° or greater with hexadecane.

The polymer layer may have a thickness of 5.0 to 20.0 μm.

The projections may be formed at an average pitch of 100 to 400 nm.

The projections may have an average height of 50 to 600 nm.

The projections may have an average aspect ratio of 0.8 to 1.5.

Advantageous Effects of Invention

The present invention can provide a decorative film excellent in antifouling properties, rubbing resistance, and adhesion even in the case of including a substrate containing a polycarbonate at least in the surface.

DESCRIPTION OF EMBODIMENTS

The present invention is described in more detail based on the following embodiment with reference to the drawings. The embodiment, however, is not intended to limit the scope of the present invention. The configurations of the embodiment may appropriately be combined or modified within the spirit of the present invention.

The expression "X to Y" as used herein means "X or more and Y or less".

[Embodiment]

Figure 1:
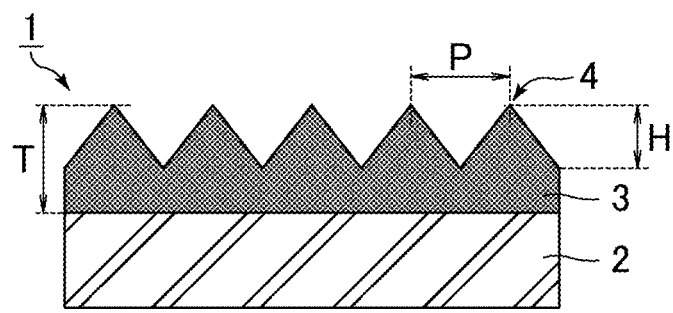
FIG. 1 is a schematic cross-sectional view of a decorative film of an embodiment.
Figure 2:
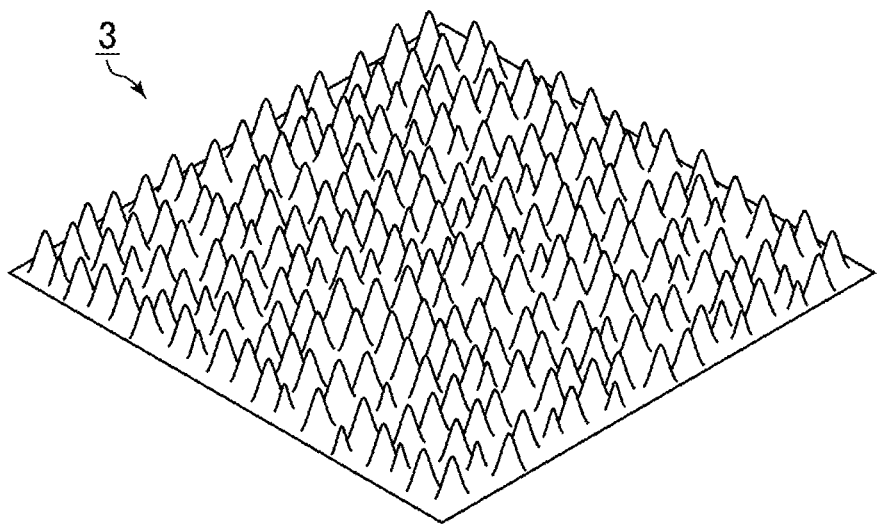
FIG. 2 is a schematic perspective view of a polymer layer in FIG. 1.

A decorative film of an embodiment is described below with reference to FIG. 1 and FIG. 2. FIG. 1 is a schematic cross-sectional view of the decorative film of the embodiment. FIG. 2 is a schematic perspective view of a polymer layer in FIG. 1.

A decorative film 1 includes a substrate 2 and a polymer layer 3 disposed on a surface of the substrate 2.

The substrate 2 contains a polycarbonate at least in its surface close to the polymer layer 3. The substrate 2 may consist of the polycarbonate or may appropriately contain additive(s) such as a plasticizer as well as the polycarbonate. Such a substrate 2 has excellent processability (e.g., ease of bending). In the case where the decorative film 1 is supposed to be bonded to a component such as a building component or an automobile component, the substrate 2 may constitute the component.

The substrate 2 preferably has a thickness of 30 to 200 μm, more preferably 50 to 150 μm, for achievement of the transparency and the processability.

Known examples of the substrate 2 include polycarbonate films such as "Iupilon®" from Mitsubishi Engineering-Plastics Corporation, "CARBOGLASS®" from AGC Inc., "PURE-ACE®" from Teijin Limited, and "Makrofol®" from Covestro AG.

The polymer layer 3 includes on a surface thereof an uneven structure on which multiple projections (protrusions) 4 are disposed with a pitch (distance between the apexes of adjacent projections 4) P not longer than the wavelength (780 nm) of visible light, i.e., a moth-eye structure (a structure like a moth's eye). Thus, the decorative film 1 can exert excellent antireflective properties (low reflectivity) owing to the moth-eye structure.

The polymer layer 3 preferably has a small thickness for distribution of the active component in the later-described release agent at a high concentration on the surface (the surface remote from the substrate 2) of the polymer layer 3. Specifically, the polymer layer 3 preferably has a thickness T of 5.0 μm to 20.0 μm, more preferably 8.0 μm to 12.0 μm. The thickness T of the polymer layer 3 indicates, as shown in FIG. 1, the distance from the surface close to the substrate 2 to the apex of a projection 4.

Examples of the shape of the projections 4 include those tapering toward the tip (tapered shapes) such as shapes consisting of a columnar lower part and a hemispherical upper part (temple-bell-like shapes) and conical shapes (cone-like shapes, circular-cone-like shapes). In FIG. 1, the bases of the gaps between any adjacent projections 4 are inclined, but the bases may not be inclined but may be flat.

The projections 4 are preferably formed at an average pitch of 100 nm to 400 nm, more preferably 100 nm to 200 nm, for sufficient prevention of optical phenomena such as moiré and iridescence. The average pitch of the projections 4 specifically means the average pitch (P in FIG. 1) of all the adjacent projections within a 1-μm-square region in a plan image taken by a scanning electron microscope.

The projections 4 preferably have an average height of 50 nm to 600 nm, more preferably 100 nm to 300 nm, for simultaneous achievement of the preferred average height and the later-described preferred average aspect ratio of the projections 4. The average height of the projections 4 specifically means the average value of the heights (H in FIG. 1) of 10 consecutive projections in a cross-sectional image taken by a scanning electron microscope. These 10 projections were selected so as not to include projections having any defect or deformed portion (e.g., a portion accidentally deformed during preparation of a measurement sample).

The projections 4 preferably have an average aspect ratio of 0.8 to 1.5, more preferably 1.0 to 1.3. If the average aspect ratio of the projections 4 is smaller than 0.8, the film may insufficiently prevent occurrence of optical phenomena such as moiré and iridescence, possibly failing to achieve good antireflective properties. If the average aspect ratio of the projections 4 is greater than 1.5, the processability of the uneven structure may be poor, sticking may occur, and transferring conditions in formation of the uneven structure may be poor (e.g., clogging of the die 6, twining of the material). The average aspect ratio of the projections 4 as used herein means the ratio of the average height of the projections 4 and the average pitch of the projections 4 (height/pitch).

The projections 4 may be arranged either randomly or regularly (periodically). The projections 4 may be arranged with periodicity. Yet, in terms of advantages such as no generation of diffracted light due to the periodicity, the projections 4 are preferably arranged with no periodicity (arranged randomly) as shown in FIG. 2.

The polymer layer 3 is a cured product of a polymerizable composition. Examples of the polymer layer 3 include a cured product of active energy ray-curable polymerizable composition and a cured product of a thermosetting polymerizable composition. The active energy rays mean ultraviolet rays, visible light, infrared rays, or plasma, for example. The polymer layer 3 is preferably a cured product of an active energy ray-curable polymerizable composition, more preferably a cured product of an ultraviolet ray-curable polymerizable composition.

The polymerizable composition contains a release agent (hereinafter, also referred to as Component A), a polyfunctional acrylate containing one or both of an ethylene oxide group and a propylene oxide group (hereinafter, also referred to as Component B), and 2-(2-vinyloxyethoxy)ethyl acrylate (hereinafter, also referred to as Component C).

The polymerizable composition contains, in terms of active components, 0.5 to 10 wt % of Component A and 10 to 70 wt % of Component C, and contains a total of 35 to 70 wt % of the ethylene oxide group and the propylene oxide group in Components B and C.

The active components (active components of Components A to C) of the polymerizable composition refer to those constituting the polymer layer 3 after curing, excluding those not contributing to the curing reaction (polymerization reaction) (e.g., solvent).

The polymerizable composition, containing the above proportions of Components A to C, may also contain other component(s).

Components A to C are described below.

<Component A>

Component A distributes the active component on the surface (the surface remote from the substrate 2) of the polymer layer 3 to lower the surface free energy of the polymer layer 3, increasing the antifouling properties. Component A also increases the smoothness, and thereby increases the rubbing resistance.

The polymerizable composition has a Component A content, in terms of active components, of 0.5 to 10 wt %, preferably 1 to 5 wt %, more preferably 1.5 to 3 wt %. When the Component A content in terms of active components in the polymerizable composition is lower than 0.5 wt %, the amount of the active component distributed on the surface (the surface remote from the substrate 2) of the polymer layer 3 is significantly small, and thus the antifouling properties decrease. Also, the smoothness decreases, so that the rubbing resistance decreases. When the Component A content in terms of active components in the polymerizable composition is higher than 10 wt %, the compatibility between Components B and C is significantly low, and thus the active component is not uniformly distributed on the surface (the surface remote from the substrate 2) of the polymer layer 3, so that the antifouling properties and the rubbing resistance decrease. In this state, the active component in Component A is easily distributed on the surface close to the substrate 2 of the polymer layer 3, and thereby the adhesion decreases. Also, bleed-out is likely to occur in a high temperature/high humidity environment, so that the optical properties decrease. In the case where the polymerizable composition contains a plurality of Components A, the total of the Component A contents in terms of active components should fall within the above range.

Component A preferably contains a fluorine-containing compound (compound containing a fluorine atom in a molecule) as an active component. In other words, Component A preferably includes a fluorine-based release agent. Examples of Component A include silicone-based release agents and phosphate-ester-based release agents as well as fluorine-based release agents. Fluorine-based release agents increase the antifouling properties and the rubbing resistance as compared with the other release agents.

The fluorine-containing compound (active component in the fluorine-based release agent) may contain a perfluoropolyether group or a perfluoroalkyl group, and preferably contains a perfluoropolyether group. Release agents containing a perfluoropolyether group increase the antifouling properties and the rubbing resistance as compared with release agents containing no perfluoropolyether group (e.g., perfluoroalkyl group-containing release agents, silicone-based release agents, phosphate-ester-based release agents).

Known examples of the fluorine-based release agents include "Fomblin® MT70" and "Fluorolink® AD1700" from Solvey, "Optool® DAC" and "Optool DAC-HP" from Daikin Industries, Ltd., "Megaface® RS-76-NS" from DIC Corporation, and "CHEMINOX® FAAC-4" and "CHEMINOX FAAC-6" from Unimatec Co., Ltd.

Known examples of the silicone-based release agents include "BYK®-UV3500", "BYK-UV3570", "BYK-UV3575", and "BYK-UV3576" from BYK Additives and Instruments, and "EBECRYL® 350" from Daicel-Allnex Ltd.

Known examples of the phosphate-ester-based release agents include "NIKKOL® TDP-2" from Nikko Chemicals Co., Ltd.

<Component B>

Component B increases the crosslinking density of the polymer layer 3 and provides an appropriate hardness (elasticity) to the polymer layer 3, increasing the rubbing resistance. The rubbing resistance is considered to correlate with the crosslinking density and glass transition temperature of the polymer layer 3. Increasing the crosslinking density and decreasing the glass transition temperature therefore can significantly increase the rubbing resistance. A polyfunctional acrylate having a long-chain structure from one or both of the ethylene oxide group and the propylene oxide group, as with Component B, can effectively decrease the glass transition temperature. Component B specifically means at least one selected from a polyfunctional acrylate containing an ethylene oxide group, a polyfunctional acrylate containing a propylene oxide group, and a polyfunctional acrylate containing an ethylene oxide group and a propylene oxide group. Here, the polyfunctional acrylate refers to an acrylate containing two or more acryloyl groups per molecule.

The number of functional groups of Component B is 2 or greater. If the number of functional groups of Component B is very large, the molecular weight may be large and thus the compatibility with Component A may decrease, so that the transparency of the polymerizable composition and the decorative film 1 may decrease. Also, cure shrinkage of the polymerizable composition or other factors may decrease the adhesion. In view of these points, the upper limit of the number of functional groups of Component B is preferably 9. The number of functional groups of Component B refers to the number of acryloyl groups per molecule.

The polymerizable composition has a Component B content, in terms of active components, of preferably 10 to 60 wt %, more preferably 20 to 50 wt %. When the Component B content in terms of active components in the polymerizable composition is within the above range, the rubbing resistance and the adhesion are further increased. In the case where the polymerizable composition contains a plurality of Components B, the total of the Component B contents in terms of active components preferably falls within the above range.

Examples of Component B include polyethylene glycol (400) diacrylate, polyethylene glycol (300) diacrylate, polyethylene glycol (200) diacrylate, ethoxylated glycerol triacrylate, and polypropylene glycol (400) diacrylate. Known examples of polyethylene glycol (400) diacrylate include "NK Ester A-400" (the number of functional groups: 2, the number of ethylene oxide groups: 9 per molecule, proportion by weight of ethylene oxide groups: 0.78) from Shin Nakamura Chemical Co., Ltd. Known examples of polyethylene glycol (300) diacrylate include "NEW FRONTIER® PE-300" (the number of functional groups: 2, the number of ethylene oxide groups: 6 per molecule, proportion by weight of ethylene oxide groups: 0.67) from DKS Co. Ltd. Known examples of polyethylene glycol (200) diacrylate include "NK Ester A-200" (the number of functional groups: 2, the number of ethylene oxide groups: 4 per molecule, proportion by weight of ethylene oxide groups: 0.57) from Shin Nakamura Chemical Co., Ltd. Known examples of ethoxylated glycerol triacrylate include "NK Ester A-GLY-20E" (the number of functional groups: 3, the number of ethylene oxide groups: 20 per molecule, proportion by weight of ethylene oxide groups: 0.78) from Shin Nakamura Chemical Co., Ltd. Known examples of polypropylene glycol (400) diacrylate include "NK Ester APG-400" (the number of functional groups: 2, the number of propylene oxide groups: 7 per molecule, proportion by weight of propylene oxide groups: 0.76) from Shin Nakamura Chemical Co., Ltd.

<Component C>

Component C is a hybrid monomer in which a vinyl ether group and an acryloyl group coexist in a molecule, the number of functional groups is 2, and the number of ethylene oxide groups is 2 per molecule. Component C has a lower molecular weight and a lower glass transition temperature than a typical monomer, and thus adding Component C to the polymerizable composition allows easy control of the crosslinking density and the glass transition temperature of the polymer layer 3 in broad ranges. Component C, having a low viscosity, is highly compatible with Components A and B (especially Component A), and therefore functions also as a compatibilizer.

Component C, having a low viscosity, is highly permeable into the substrate 2, and can significantly increase the adhesion by the anchoring effect. According to the studies made by the present inventors, the low polarity of Component C seems to contribute to the increase in adhesion. Many substrates for optical purposes are formed from triacetyl cellulose whose solubility parameter is about 16.4 $(cal/cm^3)^{1/2}$ and whose polarity is high. In contrast, the substrate 2 in the film of the present embodiment contains a polycarbonate at least in its surface close to the polymer layer 3, and the solubility parameter of the polycarbonate is about 9.7 $(cal/cm^3)^{1/2}$ and the polarity thereof is lower than that of triacetyl cellulose. Component C has a solubility parameter of about 9.2 $(cal/cm^3)^{1/2}$ and a low polarity as with the polycarbonate. This low polarity of Component C is considered to contribute to the increase in adhesion to the polycarbonate.

As described above, adding Component C to the polymerizable composition as in the present embodiment enables simultaneous achievement of the rubbing resistance and the adhesion even when the ethylene oxide group content and the propylene oxide group content in the polymerizable composition are high. In contrast, in the case where no Component C is added to the polymerizable composition, increasing the ethylene oxide group content and the propylene oxide group content in the polymerizable composition increases the rubbing resistance but decreases the adhesion, so that the rubbing resistance and the adhesion cannot be simultaneously achieved.

The polymerizable composition has a Component C content, in terms of active components, of 10 to 70 wt %, preferably 15 to 65 wt %, more preferably 20 to 60 wt %. When the Component C content in terms of active components in the polymerizable composition is lower than 10 wt %, the adhesion decreases. When the Component C content in terms of active components in the polymerizable composition is higher than 70 wt %, the ethylene oxide group content in the polymerizable composition is relatively increased, so that the adhesion decreases.

Known examples of Component C include "VEEA" (molecular weight: 186, glass transition temperature: 39° C., viscosity: 3.65 cP, proportion by weight of ethylene oxide groups: 0.47) from Nippon Shokubai Co., Ltd.

The polymerizable composition contains, in terms of active components, a total of 35 to 70 wt %, preferably 40 to 65 wt %, more preferably 45 to 60 wt %, of the ethylene oxide group and the propylene oxide group in Components B and C. In the case where the total of the ethylene oxide group content and the propylene oxide group content of Components B and C in terms of active components is lower than 35 wt %, the rubbing resistance decreases due to insufficient elasticity (very high hardness) of the polymer layer 3. In the case where the total of the ethylene oxide group content and the propylene oxide group content of Components B and C in terms of active components is higher than 70 wt %, the adhesion decreases.

Consequently, the polymerizable composition preferably contains, in terms of active components, 15 to 65 wt % of Component C and contains a total of 40 to 65 wt % of the ethylene oxide group and the propylene oxide group in Components B and C. Also, the polymerizable composition more preferably contains, in terms of active components, 20 to 60 wt % of Component C and contains a total of 45 to 60 wt % of the ethylene oxide group and the propylene oxide group in Components B and C.

The polymerizable composition may further contain a monofunctional amide monomer. The monofunctional amide monomer, as with Component C, is highly compatible with Components A and B, and is therefore preferred as a compatibilizer. However, a polymerizable composition containing a monofunctional amide monomer is likely to have a low rubbing resistance because its polymer layer 3 tends to have a low crosslinking density and a high glass transition temperature. Also, when the substrate 2 contains a polycarbonate at least in the surface (the surface close to the polymer layer 3), simply adding a monofunctional amide monomer to the polymerizable composition does not sufficiently increase the adhesion. The present embodiment therefore adds Component C to the polymerizable composition, thereby increasing the crosslinking density of the polymer layer 3 and decreasing the glass transition temperature thereof, i.e., increasing the rubbing resistance and the adhesion, while achieving the compatibility with Components A and B. Thus, even when containing a monofunctional amide monomer, the polymerizable composition can achieve excellent rubbing resistance and excellent adhesion. Here, the monofunctional amide monomer refers to a monomer containing an amide group and one acryloyl group per molecule.

Examples of the monofunctional amide monomer include N,N-dimethylacrylamide, N-acryloylmorpholine, N,N-diethylacrylamide, N-(2-hydroxyethyl)acrylamide, diacetone acrylamide, and N-n-butoxymethylacrylamide. Known examples of N,N-dimethylacrylamide include "DMAA®" from KJ Chemicals Corp. Known examples of N-acryloylmorpholine include "ACMO®" from KJ Chemicals Corp. Known examples of N,N-diethylacrylamide include "DEAA®" from KJ Chemicals Corp. Known examples of N-(2-hydroxyethyl)acrylamide include "HEAA®" from KJ Chemicals Corp. Known examples of diacetone acrylamide include "DAAM®" from Nippon Kasei Chemical Co., Ltd. Known examples of N-n-butoxymethylacrylamide include "NBMA" from MCC Unitec Co., Ltd.

When the polymerizable composition contains a monofunctional amide monomer, the monofunctional amide monomer preferably includes N,N-dimethylacrylamide. Such a monofunctional amide monomer has a low viscosity and has a higher compatibility with Components A and B.

The polymerizable composition may further contain a polymerization initiator. Thereby, the curability of the polymerizable composition increases.

Examples of the polymerization initiator include photopolymerization initiators and thermal polymerization initiators, with the photopolymerization initiators preferred. A photopolymerization initiator is active to active energy rays, and is added to initiate the polymerization reaction that polymerizes monomers.

Examples of the photopolymerization initiator include radical polymerization initiators, anionic polymerization initiators, and cationic polymerization initiators. Examples of such a photopolymerization initiator include acetophenones such as p-tert-butyltrichloroacetophenone, 2,2'-diethoxyacetophenone, and 2-hydroxy-2-methyl-1-phenylpropan-1-one; ketones such as benzophenone, 4,4'-bisdimethylaminobenzophenone, 2-chlorothioxanthone, 2-methylthioxanthone, 2-ethylthioxanthone, and 2-isopropyithioxanthone; benzoin ethers such as benzoin, benzoin methyl ether, benzoin isopropyl ether, and benzoin isobutyl ether; benzyl ketals such as benzyl dimethyl ketal and hydroxycyclohexyl phenyl ketone; acylphosphine oxides such as 2,4,6-trimethylbenzoyl-diphenyl-phosphine oxide and bis(2,4,6-trimethylbenzoyl)-phenylphosphine oxide; and alkylphenones such as 1-hydroxy-cyclohexyl-phenyl-ketone. Known examples of 2,4,6-trimethylbenzoyl-diphenyl-phosphine oxide include "LUCIRIN® TPO" and "IRGACURE® TPO" from IGM Resins. Known examples of bis(2,4,6-trimethylbenzoyl)-phenylphosphine oxide include "IRGACURE 819" from IGM Resins. Known examples of 1-hydroxy-cyclohexyl-phenyl-ketone include "IRGACURE 184" from IGM Resins.

The polymerizable composition may further contain a solvent (component other than active components). In this case, the solvent may be contained in Components A to C together with active components, or may be contained separately from Components A to C.

Examples of the solvent include alcohols (C1-C10 ones such as methanol, ethanol, n- or i-propanol, n-, sec-, or, t-butanol, benzyl alcohol, octanol), ketones (C3-C8 ones such as acetone, methyl ethyl ketone, methyl isobutyl ketone, diisobutyl ketone, dibutyl ketone, cyclohexane), esters or ether esters (C4-C10 ones such as ethyl acetate, butyl acetate, ethyl lactate), γ-butyrolactone, ethylene glycol monomethyl acetate, propylene glycol monomethyl acetate, ethers (C4-C10 ones such as EG monomethyl ether (methyl cellosolve), EG monomethyl ether (ethyl cellosolve), diethylene glycol monobutyl ether (butyl cellosolve), propylene glycol monomethyl ether), aromatic hydrocarbons (C6-C10 ones such as benzene, toluene, xylene), amides (C3-C10 ones such as dimethylformamide, dimethylacetamide, N-methylpyrrolidone), halogenated hydrocarbons (C1-C2 ones such as methylene dichloride, ethylene dichloride), and petroleum-based solvents (e.g., petroleum ether, petroleum naphtha).

In terms of the antifouling properties, the polymer layer 3 preferably has a surface (the surface remote from the substrate 2) that shows a contact angle of 130° or greater with water a contact angle of 30° or greater with hexadecane.

The decorative film 1 may be used as any component other than a component imparting a design property, and may be used as an optical component such as an antireflective film or a component imparting antifouling properties such as an antifouling film. The decorative film 1 is preferred as a component imparting a design property by, for example, being formed on the surface of a component such as a building component or an automobile component by the three dimension overlay method.

The antifouling properties of the decorative film 1 may mean that dirt adhering to the surface (the surface remote from the substrate 2) of the polymer layer 3 is easily removable, or that dirt is not likely to adhere to the surface (the surface remote from the substrate 2) of the polymer layer 3. The decorative film 1, owing to its moth-eye structure, can achieve better antifouling properties than a conventional decorative film (e.g., fluorine-containing film) having a normal surface such as a flat surface.

Figure 3:
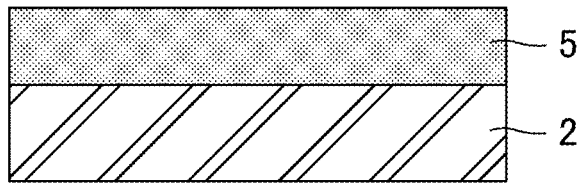
FIG. 3 is a schematic cross-sectional view illustrating an exemplary method for producing the decorative film of the embodiment.
Figure 3:
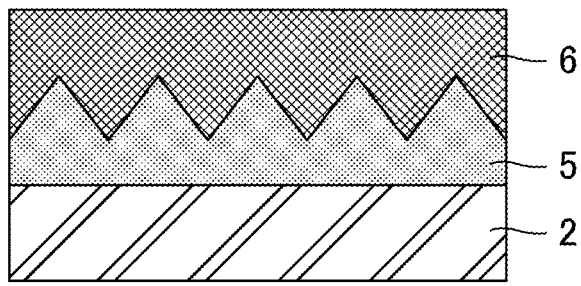
Figure 3:
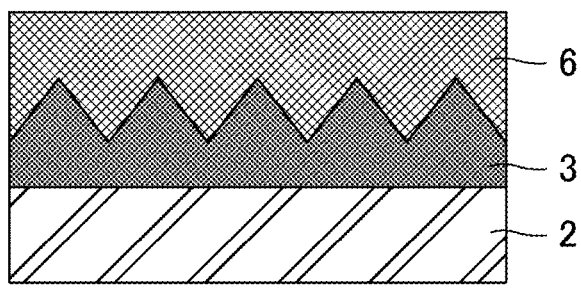
Figure 3:
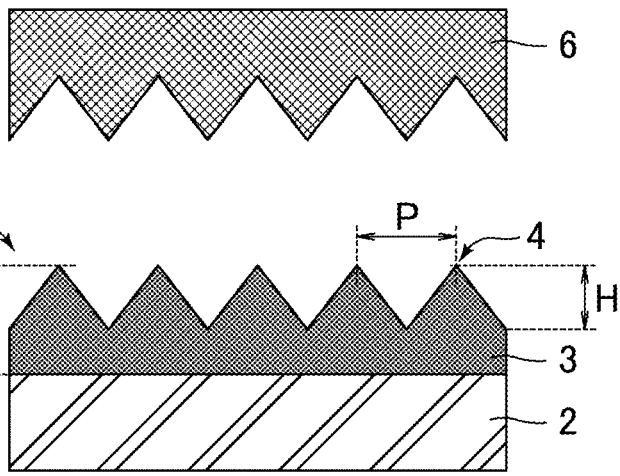

The decorative film 1 can be produced by, for example, the following production method. FIG. 3 is a schematic cross-sectional view illustrating an exemplary method for producing the decorative film of the embodiment.

(Process 1)

As shown in FIG. 3(a), a polymerizable composition 5 is applied to a surface of the substrate 2.

Examples of techniques of applying the polymerizable composition 5 include spray coating, gravure coating, slot-die coating, and bar coating. For application of the polymerizable composition 5, gravure coating or slot-die coating is preferred in order to level the thickness of the resulting film and to achieve good productivity.

The polymerizable composition 5 at least contains the above proportions of Components A to C. When the polymerizable composition 5 further contains a solvent (component other than active components), heating (drying) may be performed to remove the solvent after application of the polymerizable composition 5. The heating is preferably performed at a temperature equal to or higher than the boiling point of the solvent.

(Process 2)

As shown in FIG. 3(b), the substrate 2 is pushed to a die 6 with the polymerizable composition 5 in between. As a result, an uneven structure is formed on a surface (surface remote from the substrate 2) of the polymerizable composition 5.

(Process 3)

The polymerizable composition 5 having an uneven structure on the surface is cured. As a result, as shown in FIG. 3(c), the polymer layer 3 is formed.

Curing of the polymerizable composition 5 is achieved by, for example, application of active energy rays or heating, preferably by application of active energy rays, more preferably by application of ultraviolet rays. Application of active energy rays may be performed from the substrate 2 side of the polymerizable composition 5, or may be performed from the die 6 side of the polymerizable composition 5. Application of active energy rays may be performed once or may be performed multiple times. Curing of the polymerizable composition 5 (Process 3) may be performed simultaneously with the aforementioned formation of the uneven structure on the polymerizable composition 5 (Process 2). (Process 4)

As shown in FIG. 3(d), the die 6 is released from the polymer layer 3. As a result, the decorative film 1 is completed.

In the aforementioned exemplary production method, Processes 1 to 4 can be continuously and efficiently performed if the substrate 2 is in the form of a roll, for example.

In Processes 1 and 2, the present exemplary production method includes a process of applying the polymerizable composition 5 to the surface of the substrate 2 and then pushing the substrate 2 to the die 6 with the polymerizable composition 5 in between. Yet, the method may include a process of applying the polymerizable composition 5 to a surface of the die 6, and then pushing the substrate 2 to the die 6 with the polymerizable composition 5 in between.

The die 6 may be one produced by the following method. First, a film of aluminum that is a material of the die 6 is formed on a surface of a support by sputtering. Next, the resulting aluminum layer is repetitively subjected to anodizing and etching. Thereby, a cavity (die 6) of the moth-eye structure can be produced. At this time, the uneven structure of the die 6 can be modified by adjusting the duration of the anodizing and the duration of the etching.

Examples of a material of the support include glass; metals such as stainless steel and nickel; polyolefinic resins such as polypropylene, polymethylpentene, and cyclic olefinic polymers (typified by norbornene-based resin, e.g., "Zeonor®" from Zeon Corp., "Arton®" from JSR Corp.); polycarbonate resin; and resins such as polyethylene terephthalate, polyethylene naphthalate, and triacetyl cellulose. Instead of the support with an aluminum film formed on the surface, an aluminum support may be used.

The die 6 may have a shape of a flat plate or a roll, for example.

The surface of the die 6 preferably has undergone release treatment. Thereby, the die 6 can be easily removed from the polymer layer 3. Further, this treatment makes the surface free energy of the die 6 low, and thus the active component in Component A can uniformly be distributed on the surface (the surface remote from the substrate 2) of the polymerizable composition 5 when the substrate 2 is pushed to the die 6 in Process 2. Further, this treatment can prevent early removal of the active component in Component A from the surface (the surface remote from the substrate 2) of the polymerizable composition 5 before curing of the polymerizable composition 5. As a result, in the decorative film 1, the active component in Component A can uniformly be distributed on the surface (the surface remote from the substrate 2) of the polymer layer 3.

Examples of a material to be used for release treatment of the die 6 include fluorine-based materials, silicone-based materials, and phosphate-ester-based materials. Known examples of the fluorine-based materials include "Optool DSX" and "Optool AES4" from Daikin Industries, Ltd.

Examples and Comparative Examples

The present invention is described in more detail based on the following examples and comparative examples. The examples, however, are not intended to limit the scope of the present invention.

The materials used in production of the decorative films in the examples and comparative examples were as follows.
<Substrate>
"Iupilon KS3410UR" from Mitsubishi Engineering-Plastics Corporation was used. The thickness thereof was 110 µm.
<Die>
A die produced by the following method was used. First, a film of aluminum that is a material of the die was formed on a 10-cm-square glass substrate by sputtering. The thickness of the resulting aluminum layer was 1.0 µm. Next, the resulting aluminum layer was repetitively subjected to anodizing and etching. Thereby, an anodized layer was formed with many fine pores (distance between the bottom points of adjacent pores (recesses) was not longer than the wavelength of visible light). Specifically, anodizing, etching, anodizing, etching, anodizing, etching, anodizing, etching, and anodizing were performed successively (anodizing: 5 times, etching: 4 times), so that many fine pores (recesses) were formed each tapering toward the inside of the aluminum layer (a tapered shape). As a result, a die having an uneven structure was obtained. The anodizing was performed using oxalic acid (concentration: 0.03 wt %) at a liquid temperature of 5° C. and an applied voltage of 80 V. The duration of a single anodizing process was 25 seconds. The etching was performed using phosphoric acid (concentration: 1 mol/l) at a liquid temperature of 30° C. The duration of a single etching process was 25 minutes. The die was found to have a recess depth of 290 nm by scanning electron microscopic observation. The surface of the die was subjected to release treatment with "Optool AES4" from Daikin Industries, Ltd. in advance.
<Polymerizable Composition>
Polymerizable compositions R1 to R16 and r1 to r15 formed from the materials shown in Tables 1 to 6 were used. The values in Tables 1 to 6 are each the component content (unit: parts by weight) in the composition. The abbreviations of the respective components are as follows.
(Release Agent)
"MT70"
"Fomblin MT70" from Solvey (fluorine-based release agent)
Perfluoropolyether group: contained
Active component: 80 wt % (perfluoropolyether derivative)
Solvent: 20 wt % (methyl ethyl ketone)
"RS-76-NS"
"Megaface RS-76-NS" from DIC Corporation (fluorine-based release agent)
Perfluoropolyether group: not contained (perfluoroalkyl group was contained)
Active component: 100 wt % (fluorine group-containing oligomer (20 wt %) and dipropylene glycol diacrylate (80 wt %))
(Polyfunctional Acrylate)
"A-400"
"NK Ester A-400" from Shin Nakamura Chemical Co., Ltd.

The number of functional groups: 2
The number of ethylene oxide groups: 9 per molecule
Proportion by weight of ethylene oxide groups: 0.78
Active component: 100 wt %
"PE-300"
"NEW FRONTIER PE-300" from DKS Co. Ltd.
The number of functional groups: 2
The number of ethylene oxide groups: 6 per molecule
Proportion by weight of ethylene oxide groups: 0.67
Active component: 100 wt %
"A-200"
"NK Ester A-200" from Shin Nakamura Chemical Co., Ltd.
The number of functional groups: 2
The number of ethylene oxide groups: 4 per molecule
Proportion by weight of ethylene oxide groups: 0.57
Active component: 100 wt %
"A-GLY"
"NK Ester A-GLY-20E" from Shin Nakamura Chemical Co., Ltd.
The number of functional groups: 3
The number of ethylene oxide groups: 20 per molecule
Proportion by weight of ethylene oxide groups: 0.78
Active component: 100 wt %
"APG-400"
"NK Ester APG-400" from Shin Nakamura Chemical Co., Ltd.
The number of functional groups: 2
The number of propylene oxide groups: 7 per molecule
Proportion by weight of propylene oxide groups: 0.76
Active component: 100 wt %
"SR444"
"SR444" from Sartomer
The number of functional groups: 3
The number of ethylene oxide groups and the number of propylene oxide groups: 0 (not contained)
Active component: 100 wt %
"A-TMM"
"NK Ester A-TMM-3LM-N" from Shin Nakamura Chemical Co., Ltd.
The number of functional groups: 3
The number of ethylene oxide groups and the number of propylene oxide groups: 0 (not contained)
Active component: 100 wt %
"A-DPH"
"NK Ester A-DPH" from Shin Nakamura Chemical Co., Ltd.
The number of functional groups: 6
The number of ethylene oxide groups and the number of propylene oxide groups: 0 (not contained)
Active component: 100 wt %
"U-10"
"U-10HA" from Shin Nakamura Chemical Co., Ltd.
The number of functional groups: 10
The number of ethylene oxide groups and the number of propylene oxide groups: 0 (not contained)
Active component: 100 wt %
(2-(2-Vinyloxyethoxy)ethyl Acrylate)
"VE"
"VEEA" from Nippon Shokubai Co., Ltd.
Proportion by weight of ethylene oxide groups: 0.47
Active component: 100 wt %
(Monofunctional Amide Monomer)
"DM"
"DMAA" from KJ Chemicals Corp.
Active component: 100 wt %
(Polymerization Initiator)
"TPO"
"LUCIRIN TPO" from IGM Resins
Active component: 100 wt %

TABLE 1

| Component | Category | Abbreviation | Polymerizable composition | | | | | |
|---|---|---|---|---|---|---|---|---|
| | | | R1 | R2 | R3 | R4 | R5 | R6 |
| Release agent | Component A | MT70 | 2.375 | 2.375 | 2.375 | 2.375 | 2.375 | 2.375 |
| | | RS-76-NS | — | — | — | — | — | — |
| Polyfunctional acrylate | Component B | A-400 | 34.7 | 33.7 | 30.0 | 17.2 | 48.2 | 62.5 |
| | | PE-300 | — | — | — | — | — | — |
| | | A-200 | — | — | — | — | — | — |
| | | A-GLY | — | — | — | — | — | — |
| | | APG-400 | — | — | — | — | — | — |
| | — | SR444 | 9.6 | — | 9.6 | — | — | 9.6 |
| | | A-TMM | — | — | — | — | 14.4 | — |
| | | A-DPH | — | — | — | — | — | — |
| | | U-10 | 7.2 | 33.7 | 27.8 | 14.4 | 14.4 | 20.2 |
| 2-(2-Vinyloxyethoxy)ethyl acrylate | Component C | VE | 44.7 | 26.4 | 26.4 | 64.6 | 16.8 | 11.5 |
| Monofunctional amide monomer | — | DM | — | 2.4 | 2.4 | — | 2.4 | 2.4 |
| Polymerization initiator | — | TPO | 1.9 | 1.9 | 1.9 | 1.9 | 1.9 | 1.9 |

TABLE 2

| Component | Category | Abbreviation | Polymerizable composition | | | | |
|---|---|---|---|---|---|---|---|
| | | | R7 | R8 | R9 | R10 | R11 |
| Release agent | Component A | MT70 | 2.375 | 2.375 | — | 0.625 | 12.125 |
| | | RS-76-NS | — | — | 5.0 | — | — |
| Polyfunctional acrylate | Component B | A-400 | — | — | 37.1 | 36.1 | 31.0 |
| | | PE-300 | 48.2 | — | — | — | — |

TABLE 2-continued

| Component | Category | Abbreviation | Polymerizable composition | | | | |
|---|---|---|---|---|---|---|---|
| | | | R7 | R8 | R9 | R10 | R11 |
| | | A-200 | — | — | — | — | — |
| | | A-GLY | — | 48.2 | — | — | — |
| | | APG-400 | — | — | 9.3 | — | — |
| | — | SR444 | 14.4 | 14.4 | 14.0 | 9.6 | 9.6 |
| | | A-TMM | — | — | — | — | — |
| | | A-DPH | — | — | — | — | — |
| | | U-10 | 14.4 | 14.4 | 14.0 | 7.2 | 7.2 |
| 2-(2-Vinyloxyethoxy)ethyl acrylate | Component C | VE | 16.8 | 16.6 | 16.4 | 44.7 | 40.6 |
| Monofunctional amide monomer | — | DM | 2.4 | 2.4 | 2.3 | — | — |
| Polymerization initiator | — | TPO | 1.9 | 1.9 | 1.9 | 1.9 | 1.9 |

TABLE 3

| Component | Category | Abbreviation | Polymerizable composition | | | | |
|---|---|---|---|---|---|---|---|
| | | | R12 | R13 | R14 | R15 | R16 |
| Release agent | Component A | MT70 | 2.375 | 2.375 | 2.375 | 2.375 | 2.375 |
| | | RS-76-NS | — | — | — | — | — |
| Polyfunctional acrylate | Component B | A-400 | 29.0 | 46.9 | 57.7 | 73.7 | 28.0 |
| | | PE-300 | — | — | — | — | — |
| | | A-200 | — | — | — | — | — |
| | | A-GLY | — | — | — | — | — |
| | | APG-400 | — | — | — | — | — |
| | — | SR444 | — | — | — | — | — |
| | | A-TMM | — | — | — | — | — |
| | | A-DPH | — | — | — | — | — |
| | | U-10 | — | — | — | — | — |
| 2-(2-Vinyloxyethoxy)ethyl acrylate | Component C | VE | 64.8 | 46.9 | 38.5 | 22.5 | 68.2 |
| Monofunctional amide monomer | — | DM | 2.4 | 2.4 | — | — | — |
| Polymerization initiator | — | TPO | 1.9 | 1.9 | 1.9 | 1.9 | 1.9 |

TABLE 4

| Component | Category | Abbreviation | Polymerizable composition | | | | |
|---|---|---|---|---|---|---|---|
| | | | r1 | r2 | r3 | r4 | r5 |
| Release agent | Component A | MT70 | 2.375 | 2.375 | 2.375 | 2.375 | — |
| | | RS-76-NS | — | — | — | — | 5.0 |
| Polyfunctional acrylate | Component B | A-400 | 39.8 | 38.5 | 42.3 | — | — |
| | | PE-300 | — | — | — | 65.0 | — |
| | | A-200 | — | — | — | — | — |
| | | A-GLY | — | — | — | — | — |
| | | APG-400 | — | — | — | — | 70.0 |
| | — | SR444 | — | 24.5 | 20.7 | — | 9.1 |
| | | A-TMM | — | — | — | 28.8 | — |
| | | A-DPH | — | — | 23.6 | — | — |
| | | U-10 | 37.2 | 23.6 | — | — | 14.0 |
| 2-(2-Vinyloxyethoxy)ethyl acrylate | Component C | VE | — | — | — | — | — |
| Monofunctional amide monomer | — | DM | 19.2 | 9.6 | 9.6 | 2.4 | — |
| Polymerization initiator | — | TPO | 1.9 | 1.9 | 1.9 | 1.9 | 1.9 |

TABLE 5

| Component | Category | Abbreviation | Polymerizable composition | | | | |
|---|---|---|---|---|---|---|---|
| | | | r6 | r7 | r8 | r9 | r10 |
| Release agent | Component A | MT70 | — | 2.375 | 2.375 | 2.375 | 2.375 |
| | | RS-76-NS | — | — | — | — | — |
| Polyfunctional acrylate | Component B | A-400 | — | 14.5 | 24.0 | 28.8 | 46.6 |
| | | PE-300 | — | — | — | — | — |
| | | A-200 | 49.0 | — | 62.1 | 64.5 | 46.7 |
| | | A-GLY | — | — | — | — | — |
| | | APG-400 | — | — | — | — | — |
| | — | SR444 | — | 48.1 | — | — | — |
| | | A-TMM | — | — | — | — | — |
| | | A-DPH | — | — | — | — | — |
| | | U-10 | — | 14.4 | 7.2 | — | — |
| 2-(2-Vinyloxyethoxy)ethyl acrylate | Component C | VE | 49.0 | 16.8 | — | — | — |
| Monofunctional amide monomer | — | DM | — | 2.4 | 2.9 | 2.9 | 2.9 |
| Polymerization initiator | — | TPO | 2.0 | 1.9 | 1.9 | 1.9 | 1.9 |

TABLE 6

| Component | Category | Abbreviation | Polymerizable composition | | | | |
|---|---|---|---|---|---|---|---|
| | | | r11 | r12 | r13 | r14 | r15 |
| Release agent | Component A | MT70 | 2.375 | 2.375 | 2.375 | 0.25 | 15.0 |
| | | RS-76-NS | — | — | — | — | — |
| Polyfunctional acrylate | Component B | A-400 | 24.2 | 80.4 | — | 36.4 | 29.3 |
| | | PE-300 | — | — | 65.0 | — | — |
| | | A-200 | — | — | — | — | — |
| | | A-GLY | — | — | — | — | — |
| | | APG-400 | — | — | — | — | — |
| | — | SR444 | — | — | — | 9.6 | 9.6 |
| | | A-TMM | — | — | 22.1 | — | — |
| | | A-DPH | — | — | — | — | — |
| | | U-10 | — | — | — | 7.2 | 7.2 |
| 2-(2-Vinyloxyethoxy)ethyl acrylate | Component C | VE | 72.0 | 15.8 | 6.7 | 44.7 | 40.0 |
| Monofunctional amide monomer | — | DM | — | — | 2.4 | — | — |
| Polymerization initiator | — | TPO | 1.9 | 1.9 | 1.9 | 1.9 | 1.9 |

Tables 7 to 12 show the following amounts (1) and (2) in terms of active components.

(1) Component A to C contents in the polymerizable composition (in the tables, "Component A content", "Component B content", and "Component C content")

(2) The total of the ethylene oxide group content and the propylene oxide group content of Components B and C in the polymerizable composition (in the tables, "total of EO group content and PO group content")

TABLE 7

| | Polymerizable composition | | | | | |
|---|---|---|---|---|---|---|
| | R1 | R2 | R3 | R4 | R5 | R6 |
| Component A content (wt %) | 1.9 | 1.9 | 1.9 | 1.9 | 1.9 | 1.9 |
| Component B content (wt %) | 34.2 | 33.7 | 30.0 | 17.2 | 48.2 | 52.5 |
| Component C content (wt %) | 44.7 | 26.4 | 26.4 | 64.6 | 16.8 | 11.5 |
| Total of EO group content and PO group content (wt %) | 48.2 | 38.8 | 35.9 | 44.0 | 45.5 | 46.4 |

TABLE 8

| | Polymerizable composition | | | | |
|---|---|---|---|---|---|
| | R7 | R8 | R9 | R10 | R11 |
| Component A content (wt %) | 1.9 | 1.9 | 5.0 | 0.5 | 9.7 |
| Component B content (wt %) | 48.2 | 48.2 | 46.4 | 36.1 | 31.0 |
| Component C content (wt %) | 16.8 | 16.8 | 16.4 | 44.7 | 40.6 |
| Total of EO group content and PO group content (wt %) | 40.1 | 45.4 | 43.7 | 49.3 | 43.4 |

TABLE 9

| | Polymerizable composition | | | | |
|---|---|---|---|---|---|
| | R12 | R13 | R14 | R15 | R16 |
| Component A content (wt %) | 1.9 | 1.9 | 1.9 | 1.9 | 1.9 |
| Component B content (wt %) | 29.0 | 46.9 | 57.7 | 73.7 | 28.0 |

TABLE 9-continued

| | Polymerizable composition | | | | |
|---|---|---|---|---|---|
| | R12 | R13 | R14 | R15 | R16 |
| Component C content (wt %) | 64.8 | 46.9 | 38.5 | 22.5 | 68.2 |
| Total of EO group content and PO group content (wt %) | 53.3 | 58.7 | 63.2 | 68.1 | 54.1 |

TABLE 10

| | Polymenzable composition | | | | |
|---|---|---|---|---|---|
| | r1 | r2 | r3 | r4 | r5 |
| Component A content (wt %) | 1.9 | 1.9 | 1.9 | 1.9 | 5.0 |
| Component B content (wt %) | 39.8 | 38.5 | 42.3 | 65.0 | 70.0 |
| Component C content (wt %) | 0 | 0 | 0 | 0 | 0 |
| Total of EO group content and PO group content (wt %) | 31.0 | 30.0 | 33.0 | 43.3 | 53.0 |

TABLE 11

| | Polymerizable composition | | | | |
|---|---|---|---|---|---|
| | r6 | r7 | r8 | r9 | r10 |
| Component A content (wt %) | 0 | 1.9 | 1.9 | 1.9 | 1.9 |
| Component B content (wt %) | 49.0 | 14.5 | 86.1 | 93.3 | 93.3 |
| Component C content (wt %) | 49.0 | 16.8 | 0 | 0 | 0 |
| Total of EO group content and PO group content (wt %) | 51.2 | 19.3 | 54.2 | 59.3 | 63.0 |

TABLE 12

| | Polymerizable composition | | | | |
|---|---|---|---|---|---|
| | r11 | r12 | r13 | r14 | r15 |
| Component A content (wt %) | 1.9 | 1.9 | 1.9 | 0.2 | 12.0 |
| Component B content (wt %) | 24.2 | 80.4 | 65.0 | 36.4 | 29.3 |
| Component C content (wt %) | 72.0 | 15.8 | 6.7 | 44.7 | 40.0 |
| Total of BO group content and PO group content (wt %) | 52.9 | 70.1 | 46.5 | 49.5 | 41.8 |

Example 1

A decorative film of Example 1 was produced by the method described in the above exemplary production method.
(Process 1)
The polymerizable composition R1 was applied in a belt-like pattern. The polymerizable composition R1 was applied in accordance with two specifications, namely a specification in which the polymerizable composition R1 was applied to a surface of the substrate 2 (hereinafter, also referred to as Specification 1) and a specification in which the polymerizable composition R1 was applied to a surface of an end of the die 6 (hereinafter, also referred to as Specification 2). In Specification 2, the polymerizable composition R1 was applied to the surface of the end of the die 6 placed on a heating stage heated to 40° C. In Specification 1, the substrate 2 to which the polymerizable composition R1 was applied was heated in an oven at 80° C. for one minute, so that the solvent was evaporated from the polymerizable composition R1.
(Process 2)
In each of Specifications 1 and 2, the substrate 2 was pushed to the die 6 with the polymerizable composition R1 (from which the solvent was evaporated) in between using a hand roller. As a result, an uneven structure was formed on a surface (surface remote from the substrate 2) of the polymerizable composition R1.
(Process 3)
In each of Specifications 1 and 2, the polymerizable composition R1 having the uneven structure on the surface thereof was irradiated with ultraviolet rays (dose: 1 J/cm$^2$) from the substrate 2 side, so that the polymerizable composition R1 was cured. As a result, the polymer layer 3 was formed.
(Process 4)
In each of Specifications 1 and 2, the die 6 was released from the polymer layer 3. In Specification 2, the substrate 2 with the polymer layer 3 formed on the surface was heated in an oven at 80° C. for one minute, so that the solvent was evaporated from the polymer layer 3. As a result, the decorative films 1 in Specifications 1 and 2 were completed. The thickness T of the polymer layer 3 was 9.8 μm in each of Specifications 1 and 2.
The surface specifications of the decorative film 1 were as follows in each of Specifications 1 and 2.
  Shape of projections 4: temple-bell-like shape
  Average pitch of projections 4: 200 nm
  Average height of projections 4: 200 nm
  Average aspect ratio of projections 4: 1.0
The surface specifications of the decorative film 1 were evaluated using a scanning electron microscope "S-4700" from Hitachi High-Technologies Corp. For the evaluation, osmium(VIII) oxide from Wako Pure Chemical Industries, Ltd. was applied (to a thickness of 5 nm) on the surface (the surface remote from the substrate 2) of the polymer layer 3 using an osmium coater "Neoc-ST" from Meiwafosis Co., Ltd.

Examples 2 to 16 and Comparative Examples 1 to 15

A decorative film of each example was produced in the same manner as in Example 1, except that the composition was changed as shown in Tables 13 to 18.
[Evaluations]
The decorative films of the examples were subjected to the following evaluations. Tables 13 to 18 show the results.
<Transparency>
For the transparency, the transparency of the polymerizable composition and the transparency of the decorative film were evaluated.
(Transparency of Polymerizable Composition)
The polymerizable composition (in the state before heating process) of each example was placed in a clear test tube, and the condition of the composition was visually observed in an environment with an illuminance of 100 lx (fluorescent lamp). The evaluation criteria were as follows.

Good: The composition was transparent or slightly cloudy.

Average: The composition was slightly cloudy, but no precipitate was observed even after it was left to stand for one day.

Fair: The composition was cloudy, but no precipitate was observed even after it was left to stand for one day.

Poor: The composition was cloudy, and precipitates were observed after it was left to stand for one day.

A higher transparency of the polymerizable composition was determined to show a higher compatibility between the components (especially Component A) in the polymerizable composition.

(Transparency of Decorative Film)

The haze "Z" (unit: %) of the decorative film of each example in Specification 1 was measured with a haze meter "NDH 7000" from Nippon Denshoku Industries Co., Ltd. The evaluation criteria were as follows.

Excellent: $Z \leq 0.5$
Good: $0.5 < Z \leq 0.8$
Fair: $0.8 < Z < 1.0$
Poor: $Z \geq 1.0$ The cases evaluated as excellent, good, or fair were considered as within the allowable level (decorative film has excellent transparency).

<Antifouling Properties>

For the antifouling properties, the water repellency, the oil repellency, and the ease of wiping off fingerprints were evaluated. This evaluation was performed on the decorative film of each example in Specification 1.

(Water Repellency)

Water was dropped on the surface (the surface remote from the substrate) of the polymer layer of the decorative film of each example, and the contact angle was measured 10 seconds after the dropping.

(Oil Repellency)

Hexadecane was dropped on the surface (the surface remote from the substrate) of the polymer layer of the decorative film of each example, and the contact angle was measured 10 seconds after the dropping.

The contact angles were each the average value of contact angles measured at the following three points by the θ/2 method (θ/2=arctan(h/r), wherein 8: contact angle, r: radius of droplet, h: height of droplet) using a portable contact angle meter "PCA-1" from Kyowa Interface Science Co., Ltd. The first measurement point selected was the central portion of the decorative film of each example. The second and third measurement points were two points that were 20 mm or more apart from the first measurement point and were point-symmetrical to each other about the first measurement point.

(Ease of Wiping Off Fingerprints)

First, a black acrylic sheet was attached to the surface remote from the polymer layer of the substrate of the decorative film of each example with an optical adhesive layer in between. Next, a fingerprint was attached to the surface (the surface remote from the substrate) of the polymer layer of the decorative film of each example. The surface was rubbed 10 times in a reciprocating motion using "Bemcot® S-2" from Asahi Kasei Fibers Corp. Whether the fingerprint was wiped off or not was visually observed in an environment with an illuminance of 100 lx (fluorescent lamp). The evaluation criteria were as follows.

Good: The fingerprint was completely wiped off and no wiping residue was observed.

Fair: The fingerprint was not obvious, but slight wiping residue was observed when the light from the fluorescent lamp was reflected on the surface.

Poor: The fingerprint was not wiped off at all.

The cases evaluated as good or fair were considered as within the allowable level (having excellent ease of wiping off fingerprints).

<Rubbing Resistance>

For the rubbing resistance, the steel wool resistance was evaluated. This evaluation was performed on the decorative film of each example in Specification 1.

(Steel Wool Resistance)

First, the surface (the surface remote from the substrate) of the polymer layer of the decorative film of each example was rubbed with steel wool "#0000" from Nippon Steel Wool Co., Ltd. with a load of 400 g applied to the steel wool. The surface (the surface remote from the substrate) of the polymer layer of the decorative film of each example was visually observed in an environment with an illuminance of 100 lx (fluorescent lamp) and the number "N" of scratches on the surface was counted. The surface was rubbed with the steel wool using a surface property tester "HEIDON©-14FW" from Shinto Scientific Co., Ltd. as the test machine, with a stroke width of 30 mm, a rate of 100 mm/s, and the number of times of rubbing of 10 in a reciprocating motion. The evaluation criteria were as follows.

A: N=0
B: N=1 to 3
C: N=4 to 10
D: N=11 to 20
E: N≥21

The cases evaluated as A, B, or C were considered as within the allowable level (having excellent steel wool resistance).

<Adhesion>

The adhesion of the decorative film of each example in Specification 2 was evaluated by the following method. Specification 2 is less likely to distribute the active component in the release agent on the surface (the surface remote from the substrate) of the polymer layer at a high concentration, i.e., more likely to distribute the active component in the release agent on the substrate side of the polymer layer, than Specification 1. Also, Specification 2 is likely to evaporate the solvent after curing of the polymerizable composition (after formation of the polymer layer) unlike Specification 1, possibly decreasing the permeability (anchoring effect) of the polymerizable composition into the substrate. Specification 2 is therefore supposed to achieve lower adhesion than Specification 1.

First, 11 vertical cuts and 11 horizontal cuts were made in a grid pattern with 1 mm spacing on the surface (the surface remote from the substrate) of the polymer layer of the decorative film of each example using a snap-off utility knife at a temperature of 23° C. and a humidity of 50%. Thereby, 100 squares (1 mm square) were formed. Then, polyester adhesive tape "No. 31B" from Nitto Denko Corp. was press-applied to the squares and peeled off in the 900 direction relative to the surface of the squares at a rate of 100 mm/s. The state of the polymer layer on the substrate after the peeling was visually observed. The number "M" of squares was counted in which the polymer layer was not peeled off but left on the substrate. The evaluation criteria were as follows.

A: M=100
B: M=95 to 99
C: M=0 to 94

The cases evaluated as A were considered as within the allowable level (having excellent adhesion).

TABLE 13

| Polymerizable composition | | Example 1 R1 | Example 2 R2 | Example 3 R3 | Example 4 R4 | Example 5 R5 | Example 6 R8 |
|---|---|---|---|---|---|---|---|
| Transparency | Transparency of polymerizable composition | Good | Good | Good | Good | Good | Good |
| | Transparency of decorative film | Good | Good | Good | Good | Good | Good |
| Antifouling properties | Water repellency — Contact angle with water (°) | 156 | 158 | 158 | 158 | 152 | 152 |
| | Oil repellency — Contact angle with hexadecane (°) | 86 | 86 | 86 | 87 | 85 | 86 |
| | Ease of wiping off fingerprints | Good | Good | Good | Good | Good | Good |
| Rubbing resistance | Steel wool resistance | A | C | C | B | A | A |
| Adhesion | Result: M (number) | 100 | 100 | 100 | 100 | 100 | 100 |
| | Evaluation | A | A | A | A | A | A |

TABLE 14

| Polymerizable composition | | Example 7 R7 | Example 8 R8 | Example 9 R9 | Example 10 R10 | Example 11 R11 |
|---|---|---|---|---|---|---|
| Transparency | Transparency of polymerizable composition | Good | Good | Good | Good | Average |
| | Transparency of decorative film | Good | Good | Good | Good | Fair |
| Antifouling properties | Water repellency — Contact angle with water (°) | 153 | 154 | 132 | 141 | 161 |
| | Oil repellency — Contact angle with hexadecane (°) | 83 | 86 | 35 | 49 | 90 |
| | Ease of wiping off fingerprints | Good | Good | Fair | Fair | Good |
| Rubbing resistance | Steel wool resistance | B | A | B | A | B |
| Adhesion | Result: M (number) | 100 | 100 | 100 | 100 | 100 |
| | Evaluation | A | A | A | A | A |

TABLE 15

| Polymerizable composition | | Example 12 R12 | Example 13 R13 | Example 14 R14 | Example 15 R15 | Example 16 R16 |
|---|---|---|---|---|---|---|
| Transparency | Transparency of polymerizable composition | Good | Good | Good | Good | Good |
| | Transparency of decorative film | Good | Good | Good | Good | Good |
| Antifouling properties | Water repellency — Contact angle with water (°) | 157 | 155 | 156 | 153 | 160 |
| | Oil repellency — Contact angle with hexadecane (°) | 86 | 84 | 85 | 82 | 89 |
| | Ease of wiping off fingerprints | Good | Good | Good | Good | Good |
| Rubbing resistance | Steel wool resistance | B | A | B | C | C |
| Adhesion | Result: M (number) | 100 | 100 | 100 | 100 | 100 |
| | Evaluation | A | A | A | A | A |

TABLE 16

| Polymerizable composition | | Comparative Example 1 r1 | Comparative Example 2 r2 | Comparative Example 3 r3 | Comparative Example 4 r4 | Comparative Example 5 r5 |
|---|---|---|---|---|---|---|
| Transparency | Transparency of polymerizable composition | Good | Good | Good | Good | Good |
| | Transparency of decorative film | Good | Good | Good | Good | Good |
| Antifouling properties | Water repellency — Contact angle with water (°) | 157 | 149 | 160 | 161 | 134 |
| | Oil repellency — Contact angle with hexadecane (°) | 82 | 79 | 87 | 90 | 33 |
| | Ease of wiping off fingerprints | Good | Good | Good | Good | Fair |

TABLE 16-continued

| Polymerizable composition | | Comparative Example 1 r1 | Comparative Example 2 r2 | Comparative Example 3 r3 | Comparative Example 4 r4 | Comparative Example 5 r5 |
|---|---|---|---|---|---|---|
| Rubbing resistance | Steel wool resistance | D | D | D | B | B |
| Adhesion | Result: M(number) | 100 | 100 | 100 | 0 | 0 |
| | Evaluation | A | A | A | C | C |

TABLE 17

| Polymerizable composition | | | Comparative Example 6 r6 | Comparative Example 7 r7 | Comparative Example 8 r8 | Comparative Example 9 r9 | Comperative Example 10 r10 |
|---|---|---|---|---|---|---|---|
| Transparency | Transparency of polymerizable composition | | Good | Good | Good | Good | Good |
| | Transparency of decorative film | | Good | Good | Good | Good | Good |
| Antifouling properties | Water repellency | Contact angle with water (°) | 18 | 159 | 156 | 154 | 168 |
| | Oil repellency | Contact angle with hexadecane (°) | 14 | 85 | 86 | 84 | 87 |
| | Ease of wiping off fingerprints | | Poor | Good | Good | Good | Good |
| Rubbing resistance | Steel wool resistance | | E | E | A | A | B |
| Adhesion | Result: M(number) | | 100 | 100 | 10 | 10 | 0 |
| | Evaluation | | A | A | C | C | C |

TABLE 18

| Polymerizable composition | | | comparative Example 11 r11 | Comparative I Example 12 r12 | Comparative Example 13 r13 | Comparative Example 14 r14 | Comparative Example 15 r15 |
|---|---|---|---|---|---|---|---|
| Transparency | Transparency of polymerizable composition | | Good | Good | Good | Good | Fair |
| | Transparency of decorative film | | Good | Good | Good | Good | Poor |
| Antifouling properties | Water repellency | Contact angle with water (°) | 155 | 153 | 169 | 98 | 160 |
| | Oil repellency | Contact angle hexadecane (°) | 85 | 82 | 89 | 19 | 88 |
| | Ease of wiping off fingerprints | | Good | Good | Good | Poor | Good |
| Rubbing resistance | Steel wool resistance | | D | D | A | B | D |
| Adhesion | Result: M(number) | | 97 | 32 | 25 | 100 | 100 |
| | Evaluation | | B | C | C | A | A |

As shown in Tables 13 to 15, Examples 1 to 16 each achieved a decorative film that was excellent in the antifouling properties, rubbing resistance, and adhesion. Examples 1 to 16 also achieved excellent transparency.

In contrast, as shown in Tables 16 to 18, Comparative Examples 1 to 15 each failed to achieve a decorative film that was excellent in the antifouling properties, rubbing resistance, and adhesion.

In Comparative Examples 4, 5, 8, 9, and 10, the adhesion was low since the polymerizable composition contained no Component C. In Comparative Examples 4, 8, 9, and 10, the polymerizable composition contained a monofunctional amide monomer instead of Component C, but failed to achieve excellent adhesion.

In Comparative Examples 1, 2, 3, and 7, the rubbing resistance was low since in the polymerizable composition, the total of the ethylene oxide group content and the propylene oxide group content of Components B and C in terms of active components was lower than 35 wt %.

In Comparative Example 6, the antifouling properties and the rubbing resistance were low since the polymerizable composition contained no Component A.

In Comparative Example 12, the adhesion was low since in the polymerizable composition, the total of the ethylene oxide group content and the propylene oxide group content of Components B and C in terms of active components was higher than 70 wt %.

In Comparative Example 13, the adhesion was low since in the polymerizable composition, the Component C content in terms of active components was lower than 10 wt %.

In Comparative Example 11, the adhesion was low since in the polymerizable composition, the Component C content in terms of active components was higher than 70 wt %.

In Comparative Example 14, the antifouling properties were low since in the polymerizable composition, the Component A content in terms of active components was lower than 0.5 wt %.

In Comparative Example 15, the rubbing resistance was low since in the polymerizable composition, the Component A content in terms of active components was lower than 10 wt %. Also, the transparency was low since Component A was insolubilized.

[Additional Remarks]

One aspect of the present invention may be a decorative film including: a substrate; and a polymer layer disposed on a surface of the substrate and including on a surface thereof an uneven structure provided with projections at a pitch not longer than a wavelength of visible light, the substrate containing a polycarbonate at least in its surface close to the polymer layer, the polymer layer being a cured product of a polymerizable composition, the polymerizable composition containing a release agent, a polyfunctional acrylate containing one or both of an ethylene oxide group and a propylene oxide group, and 2-(2-vinyloxyethoxy)ethyl acrylate, the polymerizable composition containing, in terms of active components, 0.5 to 10 wt % of the release agent and 10 to 70 wt % of the 2-(2-vinyloxyethoxy)ethyl acrylate, the polymerizable composition containing, in terms of active components, a total of 35 to 70 wt % of the ethylene oxide group and the propylene oxide group in the polyfunctional acrylate and the 2-(2-vinyloxyethoxy)ethyl acrylate. This aspect can achieve a decorative film that is excellent in the antifouling properties, rubbing resistance, and adhesion even in the case of including a substrate containing a polycarbonate at least in the surface.

The release agent may contain a fluorine-containing compound as an active component. This structure further increases the antifouling properties and the rubbing resistance.

The fluorine-containing compound may contain a perfluoropolyether group. This structure further increases the antifouling properties and the rubbing resistance as compared with a release agent containing no perfluoropolyether group (e.g., perfluoroalkyl group-containing release agent, silicone-based release agent, phosphate-ester-based release agent).

The polymerizable composition may contain, in terms of active components, 15 to 65 wt % of the 2-(2-vinyloxyethoxy)ethyl acrylate, and the polymerizable composition may contain, in terms of active components, a total of 40 to 65 wt % of the ethylene oxide group and the propylene oxide group in the polyfunctional acrylate and the 2-(2-vinyloxyethoxy)ethyl acrylate.

The polymerizable composition may contain, in terms of active components, 20 to 60 wt % of the 2-(2-vinyloxyethoxy)ethyl acrylate, and the polymerizable composition may contain, in terms of active components, a total of 45 to 60 wt % of the ethylene oxide group and the propylene oxide group in the polyfunctional acrylate and the 2-(2-vinyloxyethoxy)ethyl acrylate.

The polymerizable composition may further contain a monofunctional amide monomer. This structure further increases the compatibility between the release agent and the polyfunctional acrylate.

The monofunctional amide monomer may include N,N-dimethylacrylamide. This structure decreases the viscosity of the monofunctional amide monomer and further increases the compatibility between the release agent and the polyfunctional acrylate.

The polymer layer may have a surface that shows a contact angle of 130° or greater with water and a contact angle of 30° or greater with hexadecane. This structure further increases the antifouling properties.

The polymer layer may have a thickness of 5.0 to 20.0 μm. This structure distributes the active component in the release agent on the surface (the surface remote from the substrate) of the polymer layer at a high concentration.

The projections may be formed at an average pitch of 100 to 400 nm. This structure sufficiently prevents optical phenomena such as moiré and iridescence.

The projections may have an average height of 50 to 600 nm. This structure can simultaneously achieve the preferred average height and the preferred average aspect ratio of the projections.

The projections may have an average aspect ratio of 0.8 to 1.5. This structure can sufficiently prevent optical phenomena such as moiré and iridescence, and achieve excellent antireflective properties. Also, the structure can sufficiently prevent sticking and deterioration of the transferring conditions in formation of the uneven structure, both being due to decreased processability of the uneven structure.

REFERENCE SIGNS LIST

1: decorative film
2: substrate
3: polymer layer
4: projection
5: polymerizable composition
6: die
P: pitch of projections
H: height of projections
T: thickness of polymer layer

The invention claimed is:

1. A decorative film comprising:
   a substrate; and
   a polymer layer disposed on a surface of the substrate and including on a surface thereof an uneven structure provided with projections at a pitch not longer than a wavelength of visible light,
   the substrate containing a polycarbonate at least in its surface close to the polymer layer,
   the polymer layer being a cured product of a polymerizable composition,
   the polymerizable composition containing a release agent, a polyfunctional acrylate containing one or both of an ethylene oxide group and a propylene oxide group, and 2-(2-vinyloxyethoxy)ethyl acrylate,
   the polymerizable composition containing, in terms of active components, 0.5 to 10 wt % of the release agent and 10 to 70 wt % of the 2-(2-vinyloxyethoxy)ethyl acrylate,
   the polymerizable composition containing, in terms of active components, a total of 35 to 70 wt % of the ethylene oxide group and the propylene oxide group in the polyfunctional acrylate and the 2-(2-vinyloxyethoxy)ethyl acrylate.

2. The decorative film according to claim 1,
   wherein the release agent contains a fluorine-containing compound as an active component.

3. The decorative film according to claim 2,
   wherein the fluorine-containing compound contains a perfluoropolyether group.

4. The decorative film according to claim 1,
   wherein the polymerizable composition contains, in terms of active components, 15 to 65 wt % of the 2-(2-vinyloxyethoxy)ethyl acrylate, and
   the polymerizable composition contains, in terms of active components, a total of 40 to 65 wt % of the ethylene oxide group and the propylene oxide group in the polyfunctional acrylate and the 2-(2-vinyloxyethoxy)ethyl acrylate.

5. The decorative film according to claim 4,
wherein the polymerizable composition contains, in terms of active components, 20 to 60 wt % of the 2-(2-vinyloxyethoxy)ethyl acrylate, and
the polymerizable composition contains, in terms of active components, a total of 45 to 60 wt % of the ethylene oxide group and the propylene oxide group in the polyfunctional acrylate and the 2-(2-vinyloxyethoxy)ethyl acrylate.

6. The decorative film according to claim 1,
wherein the polymerizable composition further contains a monofunctional amide monomer.

7. The decorative film according to claim 6,
wherein the monofunctional amide monomer includes N,N-dimethylacrylamide.

8. The decorative film according to claim 1,
wherein the polymer layer has a surface that shows a contact angle of 130° or greater with water and a contact angle of 30° or greater with hexadecane.

9. The decorative film according to claim 1,
wherein the polymer layer has a thickness of 5.0 to 20.0 μm.

10. The decorative film according to claim 1,
wherein the projections are formed at an average pitch of 100 to 400 nm.

11. The decorative film according to claim 1,
wherein the projections have an average height of 50 to 600 nm.

12. The decorative film according to claim 1,
wherein the projections have an average aspect ratio of 0.8 to 1.5.

13. A production method for a decorative film comprising:
applying a polymerizable composition to a surface of a substrate;
pushing the substrate to a die with the polymerizable composition in between to form an uneven structure on a surface of the polymerizable composition;
curing the polymerizable composition having the uneven structure on the surface to form a polymer layer; wherein
the substrate contains a polycarbonate at least in its surface close to the polymer layer,
the polymer layer includes on a surface thereof the uneven structure provided with projections at a pitch not longer than a wavelength of visible light,
the polymerizable composition contains a release agent, a polyfunctional acrylate containing one or both of an ethylene oxide group and a propylene oxide group, and 2-(2-vinyloxyethoxy)ethyl acrylate,
the polymerizable composition contains, in terms of active components, 0.5 to 10 wt % of the release agent and 10 to 70 wt % of the 2-(2-vinyloxyethoxy)ethyl acrylate,
the polymerizable composition contains, in terms of active components, a total of 35 to 70 wt % of the ethylene oxide group and the propylene oxide group in the polyfunctional acrylate and the 2-(2-vinyloxyethoxy)ethyl acrylate.

14. The production method for a decorative film according to claim 13,
wherein the release agent contains a fluorine-containing compound as an active component.

15. The production method for a decorative film according to claim 14,
wherein the fluorine-containing compound contains a perfluoropolyether group.

16. The production method for a decorative film according to claim 13,
wherein the polymerizable composition contains, in terms of active components, 15 to 65 wt % of the 2-(2-vinyloxyethoxy)ethyl acrylate, and
the polymerizable composition contains, in terms of active components, a total of 40 to 65 wt % of the ethylene oxide group and the propylene oxide group in the polyfunctional acrylate and the 2-(2-vinyloxyethoxy)ethyl acrylate.

17. The production method for a decorative film according to claim 16,
wherein the polymerizable composition contains, in terms of active components, 20 to 60 wt % of the 2-(2-vinyloxyethoxy)ethyl acrylate, and
the polymerizable composition contains, in terms of active components, a total of 45 to 60 wt % of the ethylene oxide group and the propylene oxide group in the polyfunctional acrylate and the 2-(2-vinyloxyethoxy)ethyl acrylate.

18. The production method for a decorative film according to claim 13,
wherein the polymerizable composition further contains a monofunctional amide monomer.

19. The production method for a decorative film according to claim 18,
wherein the monofunctional amide monomer includes N,N-dimethylacrylamide.

* * * * *